United States Patent [19]

Aida et al.

[11] Patent Number: 5,005,937
[45] Date of Patent: Apr. 9, 1991

[54] OPTICAL BRANCHING EQUIPMENT AND OPTICAL NETWORK USING THE SAME

[75] Inventors: Kazuo Aida, Yokohama; Shigendo Nishi, Yokosuka; Kiyoshi Nakagawa, Miura, all of Japan

[73] Assignee: Nippon Telegraph and Telephone Corporation, Tokyo, Japan

[21] Appl. No.: 506,832

[22] Filed: Apr. 10, 1990

[30] Foreign Application Priority Data

Apr. 14, 1989 [JP] Japan .................................. 1-94580
May 9, 1989 [JP] Japan ................................. 1-115527

[51] Int. Cl.$^5$ .............................................. G02B 6/28
[52] U.S. Cl. .................................. 350/96.16; 455/601; 455/606
[58] Field of Search .................... 350/96.16; 455/601, 455/606

[56] References Cited

U.S. PATENT DOCUMENTS 4,501,022 2/1985 Oswald .............................. 455/601
4,527,286 7/1985 Haworth ............................ 455/601

FOREIGN PATENT DOCUMENTS 0221711 7/1987 European Pat. Off. .

Primary Examiner—John D. Lee
Assistant Examiner—Stephen W. Barns
Attorney, Agent, or Firm—Pollock, Vande Sande & Priddy

[57] ABSTRACT

In optical branching equipment which is supplied with an optical signal of a first wavelength band from a trunk line terminal equipment via a trunk line cable and is inserted in the trunk line, the optical signal is normally provided to the trunk line cable after being bypassed from a branching circuit to branch line terminal equipment connected to a branch line cable, and when trouble develops in the branch line, the optical signal is delivered to the trunk line cable via a short circuit. In the short circuit there is inserted an optical limiter amplifier which is capable of amplifying light of the first and second wavelength bands. Normally the optical limiter amplifier is saturated by control light of the second wavelength supplied from the branch line terminal equipment via the branch line cable, and consequently, the optical signal of the first wavelength band is suppressed. When the supply of the control light is stopped by some cause, the optical limiter amplifier amplifies the optical signal of the wavelength band provided to the short circuit and provides the amplified optical signal to the trunk line cable.

36 Claims, 12 Drawing Sheets

OPTICAL BRANCHING EQUIPMENT AND OPTICAL NETWORK USING THE SAME

BACKGROUND OF THE INVENTION

The present invention relates to optical branching equipment which is employed in an optical network using an optical fiber cable, for switching transmission lines. The invention also pertains to such an optical network.

A bus type optical network calls for optical branching equipment which includes an optical repeater for amplifying an attenuated optical signal and a branching equipment for switching optical signal transmission lines.

FIG. 1 illustrates in block form a prior art example of optical branching equipment.

In FIG. 1 optical fiber cables $61_1$ and $61_3$ which form a trunk line is made up of optical fibers $52_1$ and $52_4$ and feed lines $59_1$ and $59_2$. Optical branching equipment 60 is provided with optical/electrical converters 53 and 55 for converting optical signals from the optical fibers $52_1$ and $52_3$ into electrical signals, electrical/optical converters 54 and 56 for converting electrical signals into optical signals for input into optical fibers $52_2$ and $52_4$, an electric circuit 58 which switches between branching circuits for connecting the optical fibers $52_2$ and $52_3$ to the optical fibers $51_1$ and $52_4$, respectively, and a short circuit for connecting the optical fibers $52_1$ and $54_4$ to each other and which performs amplification and other signal processing, and a power circuit 57 for supplying power from the feed line $59_1$ to each circuit.

The optical branching equipment 60 is usually employed as optical signal branching means in an optical network which forms a bus type optical transmission line by connecting a branch line to a trunk line. That is, the electric circuit 58 normally connects the trunk line optical fiber cables $61_1$ and $61_3$ to a branch line optical fiber cable $61_2$ and disconnects the short circuit in terms of a signal. The branch line optical fiber cable $61_2$ has connected thereto branch line terminal equipment 62, which converts an optical signal from the trunk line optical fiber cable $61_1$ into an electrical signal by an optical/electrical converter 63, adds and/or drops required information by a signal add/drop circuit 64 and converts the electrical signal into an optical signal by an electrical/optical converter 65, thereafter sending the optical signal to the trunk line optical fiber 61$_3$.

Upon occurrence of breakage or some other fault of the optical fiber cable $61_2$ which forms a branch line, the electric circuit 58 switches the transmission line to the short circuit which interconnects the optical fibers $52_1$ and $52_4$, thus disconnecting the optical fiber cable $61_2$.

For example, in a submarine repeatered transmission network employing submarine optical fiber cables, optical branching equipment for use in a bus type or star type optical network is required to be highly reliable for its long-term, maintenance-free operation. In the conventional optical branching equipment, however, each circuit employs many parts including semiconductor devices, which must be made highly reliable to meet the reliability requirement for the optical branching equipment—this inevitably raises the manufacturing costs of optical branching equipment.

Moreover, since the transmission line is supervised from a shore terminal, it is necessary to provide an independent transmission line for sending transmission line switching control information.

SUMMARY OF THE INVENTION

It is therefore an object of the present invention to provide a low-cost optical branching equipment which permits switching of optical signal transmission lines without involving the conversion of an optical signal into an electrical signal, and hence is highly reliable and free from the necessity of maintenance for a long period of time.

Another object of the present invention is to provide an optical network which employs the above-mentioned optical branching equipment.

According to an aspect of the present invention, the optical branching equipment comprises: an optical divider means for branching an optical signal from a trunk line optical signal input terminal to a branching circuit and a short circuit; an optical coupler means for providing an optical signal from either the branching circuit or the short circuit to a trunk line optical signal output terminal; pump light supply means for supplying pump light of a predetermined wavelength; and an optical limiter amplifier means which is inserted in the short circuit and is held in an excited state by the incidence thereto of the pump light and which responds to the incidence of external control light to control the gain of amplification of an optical signal, thereby permitting or inhibiting the passage therethrough of the optical signal.

The optical network of the present invention, which employs the above-mentioned optical branching equipment, includes: a bus type trunk line including an optical fiber for transmitting an optical signal of a first wavelength; trunk line terminal equipment provided at one end of the trunk line, for transmission and reception of transmission information; the above-mentioned optical branching equipment inserted in the bus type trunk line; a branch line branched from the trunk line via the optical branching equipment and including an optical fiber for transmitting an optical signal; and branch line terminal equipment connected to the branch line, for adding and/or dropping transmission information, the branch line terminal equipment including a control light source for generating control light of a second wavelength and the branch line including means for supplying the control light to the optical branching equipment.

With the optical branching equipment of the above construction, the optical limiter amplifier means inserted in the short circuit is excited by the pump light to amplify an optical signal, and in this instance, its gain is controlled by the control light. That is, when the branch line is normally connected to the optical limiter amplifier means and the control light is input thereinto, the optical limiter amplifier means is put into an output saturation state by the control light and has substantially no gain for the optical signal, and a transmission line is formed via the branching circuit. When the input of the control light stops due to breakage of the branch line, the optical limiter amplifier means amplifies the optical signal and a transmission line is formed via the short circuit.

Thus, the optical branching equipment of the present invention permits automatic transmission line switching and optical signal amplification while maintaining the optical signal intact.

By employing the above optical branching equipment as optical signal branching means in the bus type optical network and supplying the control light to the optical branching equipment via the optical fiber of the branch line from the control light source provided in the branch line terminal equipment, it is possible to perform automatic switching to the short circuit, for example, upon breakage of the branch line. Moreover, the optical signal can be switched and amplified intact on the transmission line.

According to another aspect of the present invention, in the optical network the trunk line terminal equipment provides an optical signal of a first wavelength band on a trunk line cable and the optical branching equipment inserted in the trunk line cable divides the optical signal into a plurality of optical signals and applies them to optical amplifying elements, respectively. Only when excited by the pump light, the optical amplifying elements each provide a gain for the optical signal, and the optical amplifying element is supplied with the pump light via a branch line cable from the pump light source provided in the branch line terminal equipment. When excited by the pump light, the optical amplifying element amplifies the optical signal and sends it via the optical signal transmission fiber to the branch line terminal equipment.

Also in the above optical network, since the pump light source is provided in the branch line terminal equipment, the optical branching equipment does not call for any particular electronic devices for the optical signal transmission. This ensures the implementation of a highly reliable, highly economical optical network which does not require maintenance for a long period of time.

DESCRIPTION OF THE PREFERRED EMBODIMENTS

With reference to the drawings, embodiments of the present invention will hereinafter be described in detail.

Figure 2:
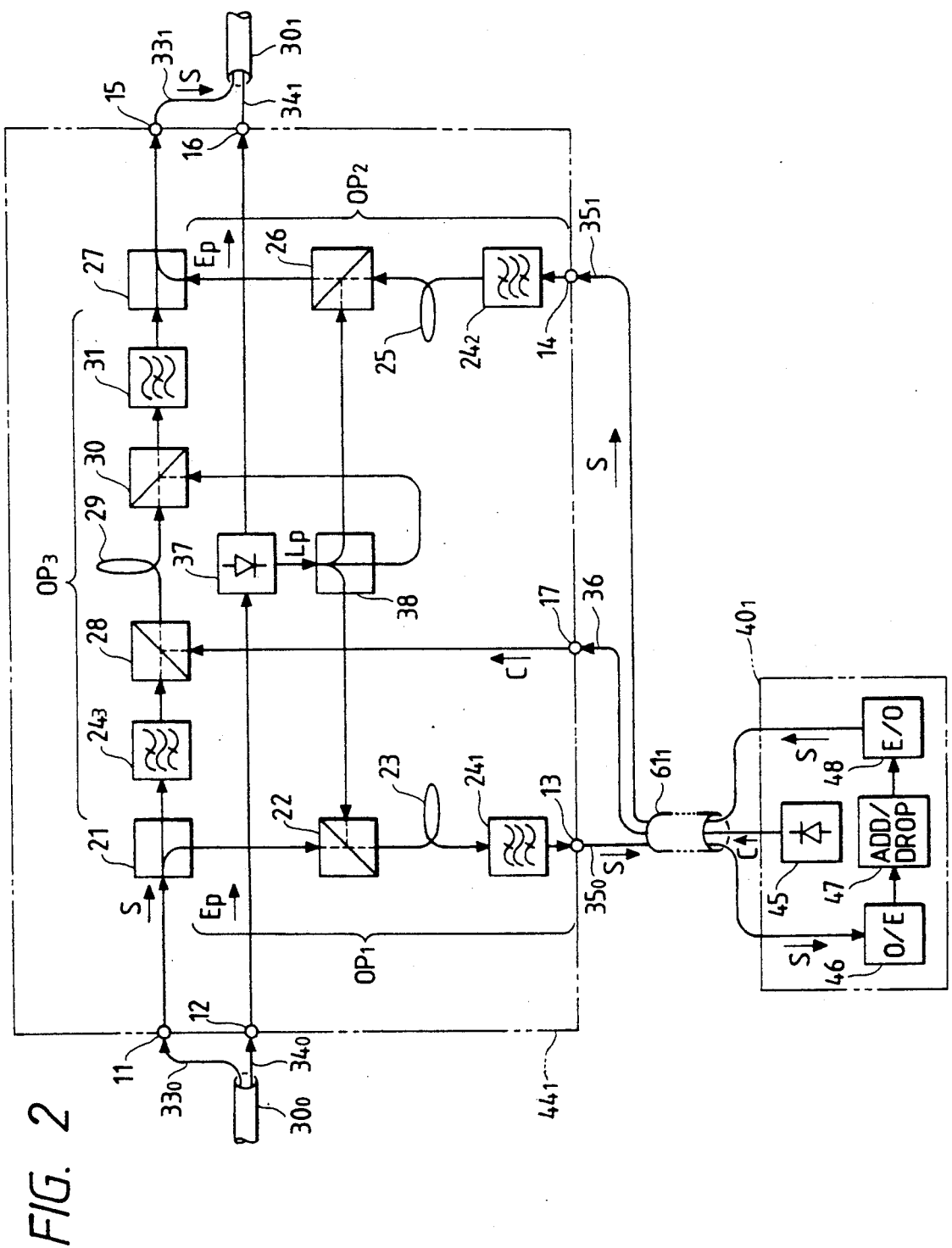
FIG. 2 is a block diagram illustrating an embodiment of the optical branching equipment of the present invention, together with branch line terminal equipment connected thereto.

FIG. 2 illustrates in block form an embodiment of the optical branching equipment according to the present invention. For convenience of description, branch line terminal equipment $40_1$ connected to the optical branching equipment $44_1$ is also depicted.

In FIG. 2 the optical branching equipment $44_1$ of this embodiment has an optical signal input terminal 11 and an optical signal output terminal 15 respectively connected to optical signal transmission fibers $33_0$ and $33_1$ which form a trunk line, and an optical signal output terminal 13 and an optical signal input terminal 14 which are respectively connected to optical signal transmission fibers $35_0$ and $35_1$ which form a branch line. The optical branching equipment switches an optical signal transmission line to a branching circuit and a short circuit as required.

Figure 1:
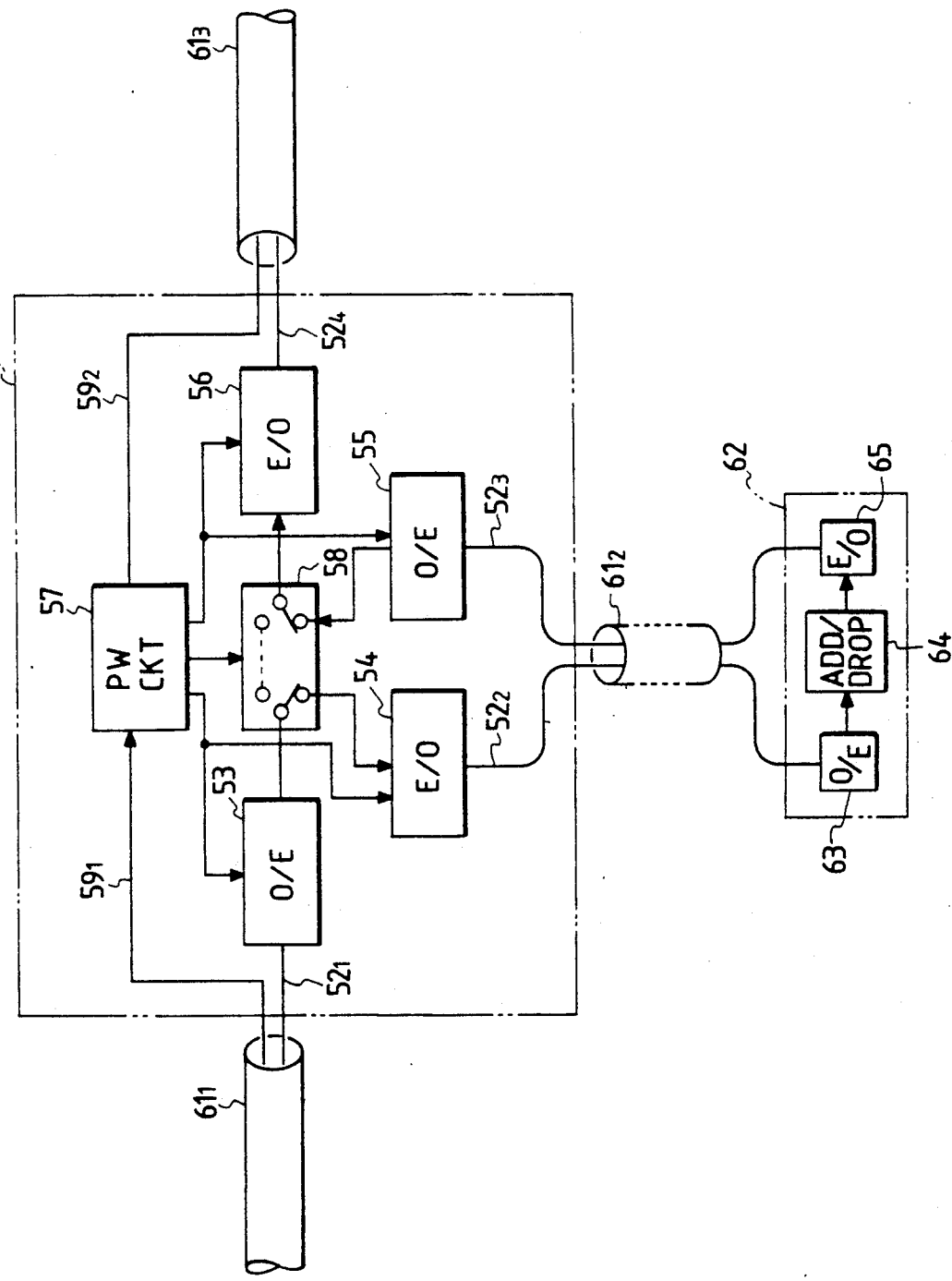
FIG. 1 is a block diagram showing conventional optical branching equipment.

An optical signal S of a wavelength 1.55 μm, which is input via the optical signal input terminal $11_2$, is provided in two directions via an optical divider 21. The one optical signal S is applied to the optical signal output terminal 13 via a pump light coupler 22, an erbium-doped fiber 23 and a 1.55 μm wavelength band-pass optical filter $24_1$. An optical path $OP_1$ from the optical divider 21 to the optical signal output terminal 13 constitutes a branching circuit. The optical signal S is sent via the optical signal transmission fiber $35_0$ of a branch line cable $61_1$ to the branch line terminal equipment $40_1$. In the branch line terminal equipment $40_1$, as is the case with the prior art example shown in FIG. 1, the optical signal S is converted by an optical/electrical converter 46 into an electrical signal, which is applied to a signal add/drop circuit 47 for adding and/or dropping of required information, and the electrical signal is reconverted by an electrical/optical converter 48 into the optical signal S, which is then provided via the optical fiber $35_1$ to the input terminal 14 of the optical branching equipment $44_1$.

The optical signal S thus applied to the optical signal input terminal 14 is applied via a 1.55 μm wavelength band-pass optical filter $24_2$, an erbium-doped fiber 25 and a pump light coupler 26 to an optical coupler 27, from which it is provided to the optical signal output terminal 15. An optical path $OP_2$ from the optical signal input terminal 14 to the optical coupler 27 constitutes a branching circuit. The erbium-doped fiber has a length of, for example, tens to a hundred meters. It is well-known in the art that the erbium-doped fiber is excited by pump light of a wavelength band ranging from 1.46 to 1.49 μm to amplify signal light of a wavelength ranging from 1.53 to 1.56 μm and has peaks of gain at wavelengths of 1.535 and 1.55 μm (see OFC '89 POST-DEADLINE PAPER THURSDAY, FEB. 9, 1989, PD15, "A 212 km NON-REPEATED Er+3 DOPED FIBER AMPLIFIERS IN AN IM/DIRECT-DETECTION REPEATER SYSTEM", K. HAGIMOTO, et al). The erbium-doped fiber will hereinafter be referred to as a fiber optical amplifying element or simply as an optical amplifying element.

The other optical signal output from the optical divider 21 is applied to an eribum-doped fiber 29 via a 1.55 μm wavelength band-pass optical fiber $24_3$ and a control light coupler 28. The optical signal emitted from the erbium-doped fiber 29 is applied to the optical coupler 27 via pump light coupler 30 and a band-rejection optical filter 31 which cuts off control light C having a wavelength of 1.535 μm. The optical signal thus applied to the optical coupler 27 is provided therefrom to the optical signal output terminal 15. An optical path $OP_3$ from the optical divider 21 to the optical coupler 27 constitutes a short circuit.

A laser diode 37, which is connected to power feed terminals 12 and 16 connected to feed lines $34_0$ and $34_1$ of the trunk line, respectively, and is supplied with power Ep, yields pump light Lp of a wavelength 1.48 μm. The pump light Lp is applied via an optical divider 38 to the pump light couplers 22, 26 and 30, from which it is provided to the erbium-doped fibers 23, 25 and 29.

The control light C of a wavelength 1.535 μm, which is input via a control light input terminal 17 connected to a control light transmission fiber 36 accommodated in the branch line cable $61_1$, is combined with the optical signal S by the control coupler 28 for incidence to the erbium-doped fiber 29. The control light C is generated by a control light source 45 provided in the branch line terminal equipment $40_1$ and is supplied via the control light transmission fiber 36 of the branch line cable $61_1$.

The optical divider 38, the pump light couplers 22, 26 and 30, and the control light coupler 28 are provided to efficiently input the optical signal S and the pump light Lp or the control light C into the erbium-doped fibers 23, 25 and 29. The 1.55 μm band-pass optical filters $24_1$ through $24_3$ reject optical noises emitted from the erbium-doped fibers 23, 25 and 29, whereas the 1.535 μm band-rejection optical filter 31 rejects the control light C emitted from the erbium-doped fiber 29. The optical filter 31 may also be a band-pass optical filter which passes therethrough the optical signal S but rejects the control light C and other optical noises, and in such an instance, the SN ratio of the optical signal S is improved.

Figure 3:
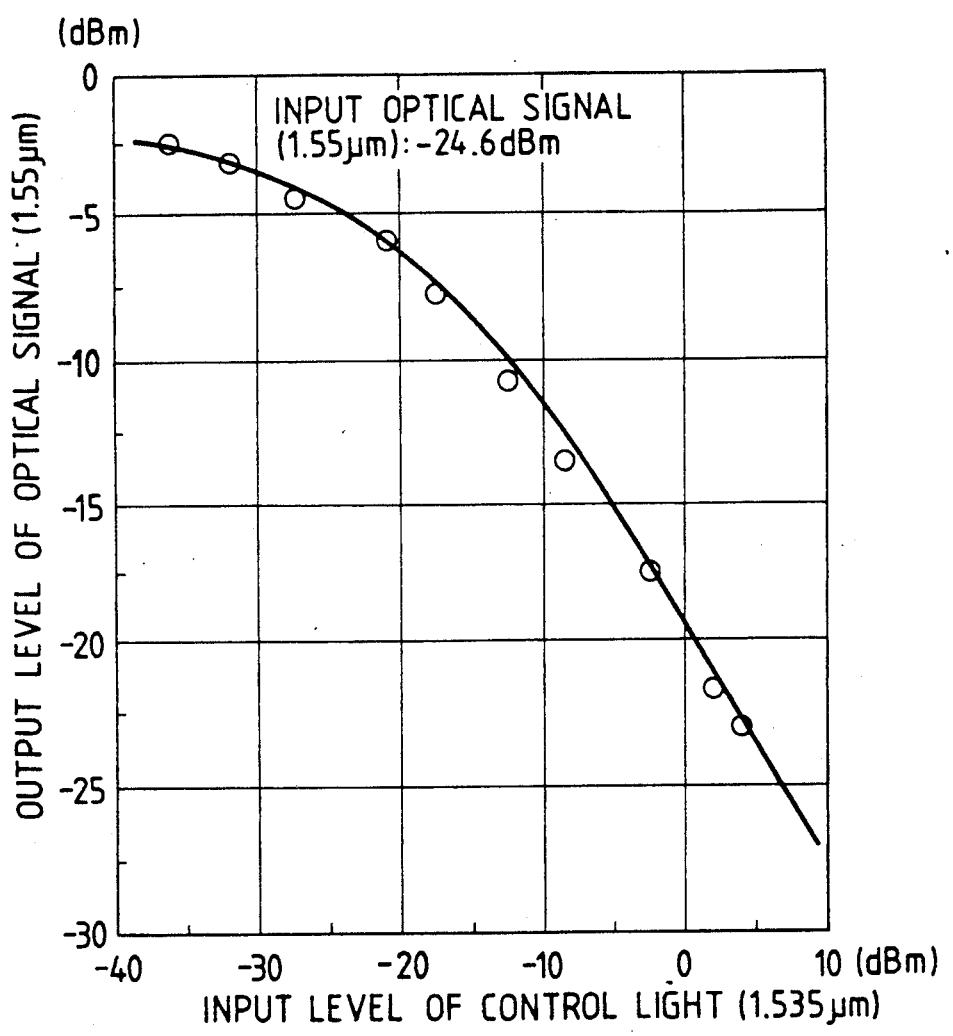
FIG. 3 is a graph showing a characteristic of an optical amplifying element formed by an erbium-doped fiber.

The erbium-doped fiber 29 is excited by the incidence thereto of the pump light Lp (having a wavelength of 1.48 μm), in which state it is able to amplify the optical signal S having a wavelength of 1.55 μm and the control light C having a wavelength of 1.535 μm within its linear operation range. However, when supplied with the control light C of high power, the erbium-doped fiber 29 is put in an output saturation state, in which case it provides substantially no gain for the optical signal S. FIG. 3 shows measured values of the amplified optical signal level derived from the erbium-doped fiber when an optical signal of the above-mentioned wavelength having a level of 24.68 dBm and control light of the above-mentioned wavelength were input into the erbium-doped fiber excited by pump light of a constant level and the level of the input control light was changed. The level of the amplified optical signal was about −2.5 dBm when no control light was input. As will be appreciated from FIG. 3, an increase in the input level of the control light causes a decrease in the level of the output optical signal and the output level of the optical signal can be suppressed to a very small value by use of control light of a sufficiently high input level. In other words, the erbium-doped fiber 29 in FIG. 2 operates as a limiter amplifier, and by inputting control light of a high level into the erbium-doped fiber 29, the short circuit $OP_3$ between the optical signal transmission fibers $30_0$ and $30_1$ is substantially disconnected in connection with the optical signal. On the other hand, the control light amplified to its saturation is cut off by the filter 31, and hence is not provided to the output terminal 15. Incidentally, the effect of suppressing a low-power optical signal by a high-power one in the optical amplifying element can be produced between a plurality of optical signals of given wavelengths in the wavelength band over which the optical amplifying element provides its gain, and embodiments of the optical network of the present invention described later utilize the effect of suppressing a low-power optical signal by a high-power optical signal of the same wavelength.

On the other hand, the erbium-doped fibers 23 and 25, which are always excited by the pump light Lp of the aforementioned wavelength, amplify the optical signal S and connect the trunk line optical signal transmission fibers $33_0$ and $33_1$ and the branch line optical signal transmission fibers $35_0$ and $35_1$ to each other, forming a bus type transmission line.

When the input of the control light C from the control light transmission fiber 36 stops, the optical limiter amplifier, i.e. the erbium-doped fiber 29 gets out of the saturated state, and consequently, it amplifies the optical signal S applied via the control light coupler 28 and outputs the amplified optical signal S. The optical signal S is applied via the pump light coupler 30, the 1.535 μm wavelength band-rejection optical filter 31, the optical coupler 27 and the optical signal output terminal 15 to the optical signal transmission fiber $33_1$, thus interconnecting the optical signal transmission fibers $33_0$ and $33_1$ of the trunk line to form a short circuit. For instance, when the branch line cable $61_1$ accommodating the optical signal transmission fibers $35_0$ and $35_1$ and the control light transmission fiber 36 is broken by some cause, the supply of the control light C is stopped, and consequently, the optical limiter amplifier 29 amplifies and outputs the optical signal S applied thereto from the optical signal input terminal 11, and the amplified optical signal S is provided via the optical filter 31 and the optical coupler 27 to the optical signal output terminal 15. In the embodiment shown in FIG. 2 the couplers 28 and 30 for the incidence of the control light C and the pump light Lp may be exchanged in position, in which case the optical filter 31 may be left out. This applies to the embodiments described later.

It has been described previously in respect of FIG. 3 that the output signal light of the wavelength 1.55 μm can be suppressed by applying light of the wavelength 1.535 μm as control light to the erbium-doped fiber. Conversely, light of the wavelength 1.55 μm may be used as the control light to suppress the output signal light of the wavelength 1.535 μm. Moreover, in the embodiment of FIG. 2, when the branch line terminal equipment $40_1$ is disposed at a location near the optical branching equipment $44_1$, it is possible to connect the optical divider 21 directly to the output terminal 13 and the input terminal 14 directly to the optical coupler 27, omitting the couplers 22 and 26, the optical amplifying elements 33 and 25 and the optical filters $24_1$ and $24_2$.

Figure 4:
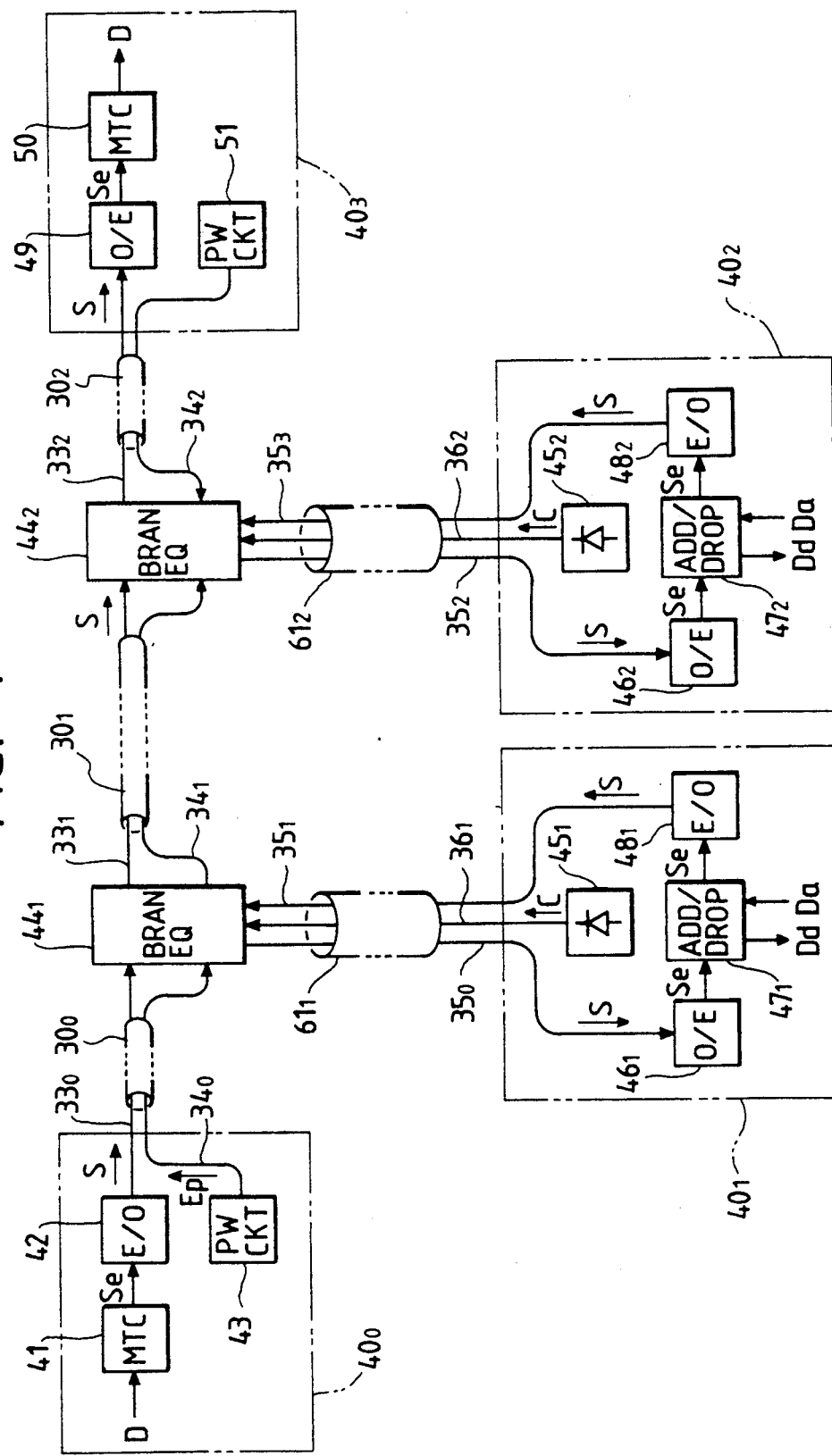
FIG. 4 is a block diagram illustrating an embodiment of the optical network of the present invention.

FIG. 4 illustrates in block form an embodiment of the optical network according to the present invention. This embodiment is a bus type optical network in which an optical signal having a wavelength of 1.55 μm is transmitted, and optical branching equipment used is identical in construction with that shown in FIG. 2.

In FIG. 4 trunk line terminal equipments $40_0$ and $40_3$ are interconnected via optical signal transmission fibers $33_0$ to $33_3$ and feed lines $34_0$ to $34_2$, which form trunk line cables $30_0$ to $30_2$, and via optical branching equipments $44_1$ and $44_2$. The optical branching equipments $44_1$ and $44_2$ have connected thereto branch line terminal equipments $40_1$ and $40_2$ via optical signal transmission fibers $35_0$ to $35_3$ and control light transmission fibers $36_1$ and $36_2$ which form branch line cables $61_1$ and $61_2$. Now, let it be assumed, for the sake of brevity, that the optical signal S is transmitted in a direction from the trunk line terminal equipment $40_0$ to $40_3$.

The trunk line terminal equipment $40_0$ is provided with a matching circuit 41 which outputs an electrical signal Se produced by converting transmission information D into a line code, an electrical/optical converter 42 which converts the electrical signal Se into an optical signal S having a wavelength of 1.55 μm and provides it to the optical signal transmission fiber $33_0$, and a power circuit 43 connected to the feed line $34_0$.

The trunk line terminal equipment $40_3$ is provided with an optical/electrical converter 49 whereby the optical signal S input thereinto from the optical signal transmission fiber $33_2$ is converted into the electrical signal Se, a matching circuit 50 which extracts the transmitted information D from the electrical signal Se, and a power circuit 51 connected to the feed line $34_2$.

The branch line terminal equipments $40_1$ and $40_2$ are respectively provided with optical/electrical converters $46_1$ and $46_2$ whereby the optical signal S of the wavelength 1.55 μm input from the optical signal transmission fibers $35_0$ and $35_2$ is converted into an electrical signal Se, signal add/drop circuits $47_1$ and $47_2$ which drop desired information Dd from the electrical signal Se and add thereto information Da to be transmitted, and electrical/optical converters $48_1$ and $48_2$ whereby the electrical signal Se having the information dropped therefrom and added thereto is converted into the optical signal S of the wavelength 1.55 μm for output to the optical signal transmission fibers $35_1$ and $35_3$. Furthermore, the branch line terminal equipments $40_1$ and $40_2$ include control light sources $45_1$ and $45_2$ which generate the control light C of the wavelength 1.535 μm and apply it to the optical branching equipments $44_1$ and $44_2$. This is characteristic of the present invention.

By the input of the control light C of the wavelength 1.535 μm into the optical branching equipments $44_1$ and $44_2$, the short circuit between the optical signal transmission fibers $33_0$ and $33_1$ and the short circuit between the optical signal transmission fibers $33_1$ and $33_2$ are disconnected apparently, and branching circuits are formed, respectively.

The optical signal S delivered to the optical signal transmission fiber $33_0$ from the trunk line terminal equipment $40_0$ at the transmitting side is provided via the optical branching equipment $44_1$ to the optical signal transmission fiber $35_0$ for transmission to the branch line terminal equipment $40_1$. In the branch line terminal equipment $40_1$ the optical signal S is converted by the optical/electrical converter $46_1$ into the electrical signal Se, which is applied to the signal add/drop circuit $47_1$, in which the information Dd and Da are dropped from and added to the electrical signal Se. Thereafter, the electrical signal Se is converted again by the electrical-/optical converter $48_1$ into the optical signal S of the wavelength 1.55 μm for transmission to the optical branching equipment $44_1$ via the optical signal transmission fiber $35_1$. The optical signal S is provided on the optical signal transmission fiber $33_1$ from the optical branching equipment $44_1$.

Similarly, the optical signal S thus transmitted to the optical branching equipment $44_2$ is provided via the branch line cable $61_2$ to the branch line terminal equipment $40_2$ and thence to the trunk line terminal equipment $40_3$ of the receiving station via the optical signal transmission fiber $33_2$.

For example, in the event that the branch line cable $61_1$ including the optical signal transmission fibers $35_0$ and $35_1$ and the control light transmission fiber $36_1$ is broken between the optical branching equipment $44_1$ and the branch line terminal equipment $40_1$, the supply of the control light C to the optical branching equipment $44_1$ is stopped. As a result of this, the optical branching equipment $44_1$ forms the above-mentioned short circuit between the optical signal transmission fibers $33_0$ and $33_1$, disconnecting the branch line terminal equipment $40_1$. Thus, the transmission line can automatically be switched, if the branch line cable is broken.

While in the above the present invention has been described as being applied to the bus type optical network, the invention is applicable as well to the star type network. Further, the above embodiments have been described in connection with the case where the erbium-doped fiber is used as the optical amplifying element and the optical limiter amplifier and the first and second wavelength bands are 1.55 and 1.535 μm, respectively, but other wavelengths can be employed as the first and second wavelength bands in the case of using a fiber doped with other rare earth elements.

Figure 5:
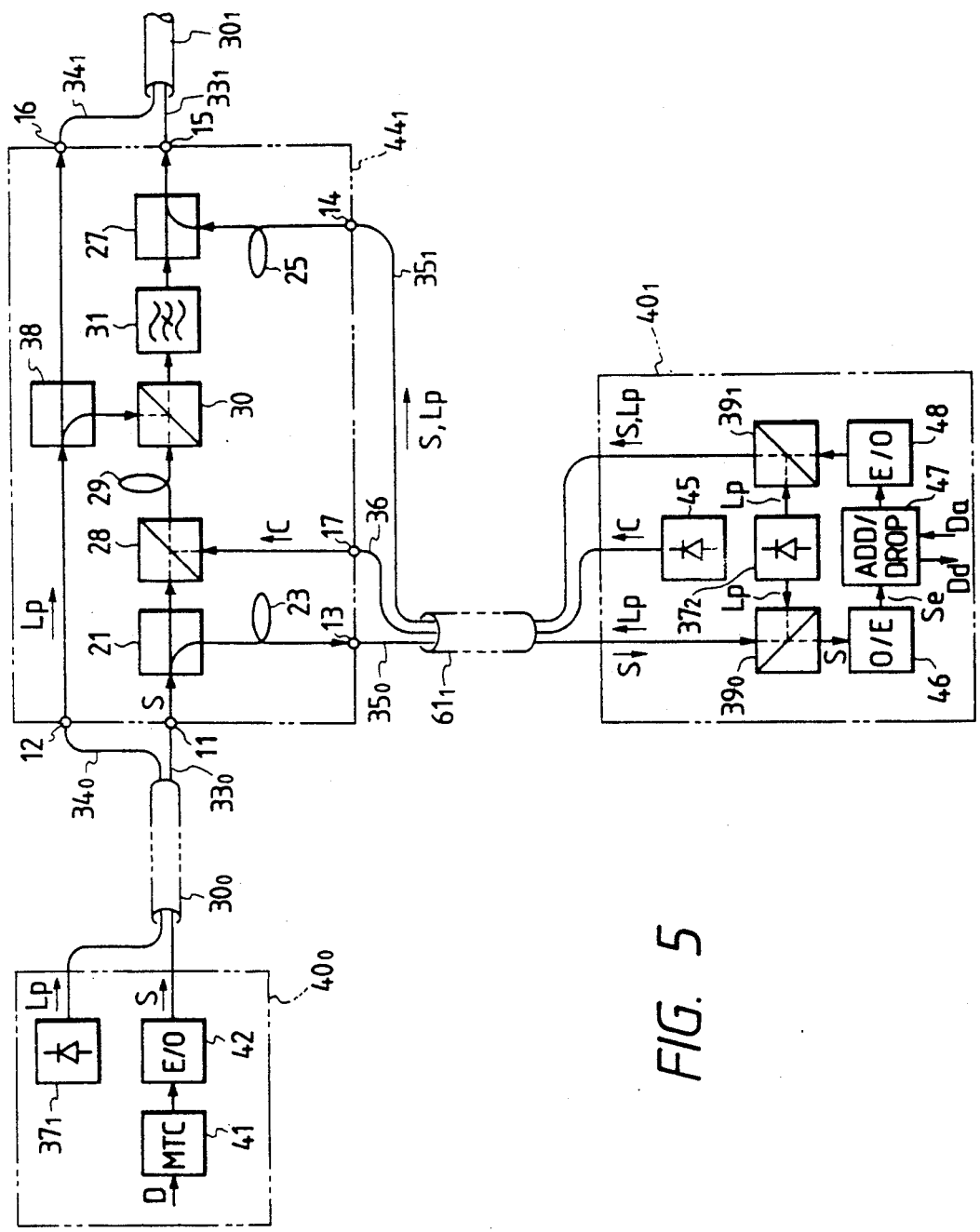
FIG. 5 is a block diagram illustrating another embodiment of each of the optical branching equipment and the optical network according to the present invention.

FIG. 5 illustrates the principal part of a modified form of the optical branching equipment $44_1$ shown in FIG. 2. In this example, the pump light Lp is generated by a pump light source $37_1$ provided in the trunk line terminal equipment $40_0$ and is provided to the optical branching equipment $44_1$ via the pump light transmission fiber $34_0$ of the trunk line optical cable $30_0$. In the optical branching equipment $44_1$ the pump light Lp is divided by an optical divider 38 into two, one of which is applied to the optical limiter amplifier 29 via the coupler 30. The other pump light Lp is sent to the next stage via the pump light transmission fiber $34_1$. In this embodiment the pump light Lp to the optical amplifying elements 23 and 25 is supplied from the branch line terminal equipment $40_1$. To this end, a pump light source $37_2$ is provided in the branch line terminal equipment $40_1$ and the pump light from the pump light source $37_2$ is supplied to the optical amplifying elements 23 and 25 from couplers $39_0$ and $39_1$ via the optical signal transmission fibers $35_0$ and $35_1$, respectively. As is the case with the embodiment depicted in FIG. 2, the branch line terminal equipment $40_1$ has the control light source 45, from which the control light C is supplied via the optical fiber 36 to the optical branching equipment $44_1$. The principle of operation of the optical branching equipment $44_1$ is exactly the same as in the embodiment of FIG. 2, and hence no description will be repeated in this respect. As will be seen from the above, no pump light source is incorporated in the optical branching equipment $44_1$ depicted in FIG. 5 unlike in the case of FIG. 2; so that no electronic devices are employed. Accordingly, this optical branching equipment can be expected to perform a highly reliable operation for a long period of time. Also in this embodiment, if the branch line terminal equipment $40_1$ is located near the optical branching equipment $44_1$, the optical amplifying elements 23 and 25 could be omitted, and consequently, the pump light supply means $37_2$, $39_0$ and $39_1$ would not be needed. While in the above the pump light source $37_1$ is described to be provided in the trunk line terminal equipment $40_0$ of the transmitting side, it is apparent that the pump light source $37_1$ may be provided in the trunk line terminal equipment of the receiving side or in either of them.

Figure 6:
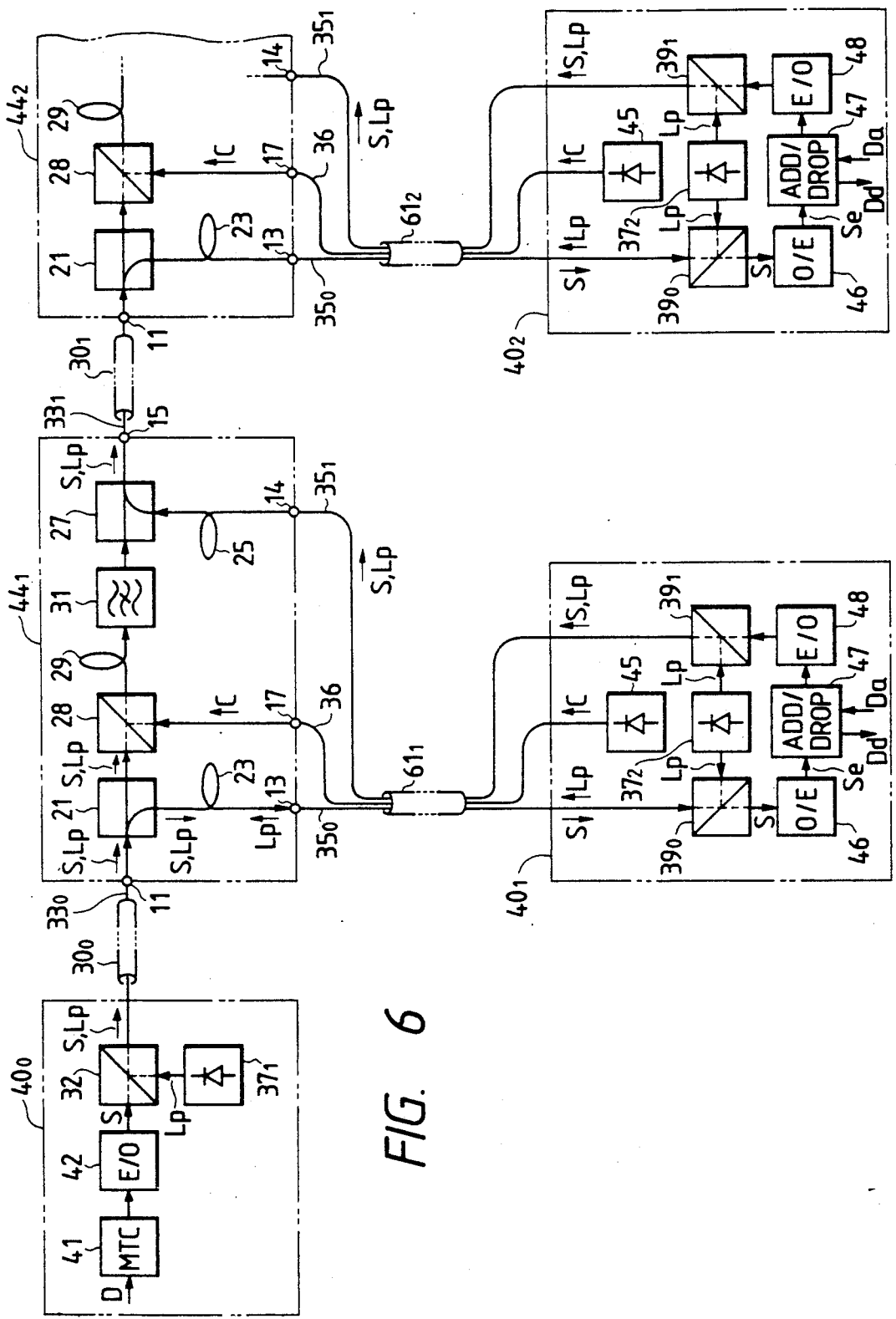
FIG. 6 is a block diagram illustrating another embodiment of each of the optical branching equipment and the optical network according to the present invention.

FIG. 6 illustrates a modification of the embodiment shown in FIG. 5. In FIG. 5 the pump light Lp for the optical limiter amplifier 29 is supplied via the pump light transmission fiber $34_0$ accommodated in the trunk line optical cable $30_0$, whereas in FIG. 6 the pump light Lp is supplied to the optical limiter amplifier 20 of the optical branching equipment $44_1$ via the optical signal transmission fiber $33_0$ of the trunk line optical fiber cable $30_0$. That is, the pump light source $37_1$ is provided in the trunk line terminal equipment $40_0$ and the pump light Lp generated by the pump light source $37_1$ is wavelength multiplexed with the optical signal S by a coupler 32 and then provided on the optical signal transmission fiber $33_0$. In the optical branching equipment $44_1$ the optical signal S and the pump light Lp supplied thereto are divided by the optical divider 21 into two, one of which is applied via the coupler 28 to the optical limiter amplifier 29. The other pump light Lp and optical signal S are applied to the optical amplifying element 23, by which the optical signal S is amplified, thereafter being sent to the branch line terminal equipment $40_1$. An important feature of the optical network shown in FIG. 6 resides in the following arrangement. Namely, the pump light source $37_2$ is provided in each of the branch line terminal equipments $40_1$, $40_2$, . . . (only two of which are shown). The pump light Lp from the pump light source $37_2$ in the branch line terminal equipment $40_1$, for instance, is provided via the coupler $39_0$ to the optical signal transmission fiber $35_0$ of the branch line optical cable $61_1$, over which it is transmitted to the optical branching equipment $44_1$, exciting the optical amplifying element 23 therein. At the same time, the pump light Lp from the pump light source $37_2$ is wavelength multiplexed with the optical signal S by the coupler $39_1$ and thence transmitted via the optical signal transmission fiber $35_1$ of the branch line optical cable $61_1$ to the optical branching equipment $44_1$, exciting the optical amplifying element 25 therein. The remaining pump light Lp from the optical amplifying element 25 is input into the coupler 27, from which it is transmitted via the optical signal transmission fiber $33_1$ of the trunk line optical cable $30_1$ to the optical limiter amplifier 29 of the next-stage optical branching equipment $44_2$ (partly shown) of the same construction as the optical branching equipment $44_1$.

As will be understood from the description given previously of FIG. 3, the state of operation of each optical limiter amplifier 29 is dependent on the ON/OFF state of the pump light Lp supplied from the preceding stage and the control light C from the branch line terminal equipment. For instance, in the optical branching equipment of FIG. 6, when the pump light Lp supplied from the trunk line terminal equipment $40_0$ and the control light C from the branch line terminal equipment $40_1$ are both ON, the operation of the optical limiter amplifier 29 reaches a saturated state, substantially cutting off the optical signal S. Where the pump light Lp is ON and the control light C is OFF, the optical limiter amplifier 29 is a linear operating state and amplifies and outputs the optical signal S. When the pump light Lp is OFF, the optical limiter amplifier 29 operates as an attenuator for the optical signal S, and hence cuts it off regardless of the ON/OFF state of the control light C. Thus, in the optical network of the construction shown in FIG. 6, as is the case with the embodiment of FIG. 5, when the branch line optical cable $61_1$ is broken, or when the branch line terminal equipment $40_1$ becomes inoperable, the control light C is not supplied to the optical branching equipment $44_1$, and consequently, the optical limiter amplifier 29 enters the linear operating state, in which it amplifies the signal light S from the optical divider 21 and outputs it to the coupler 27 (short circuit connection). At this time, the supply of the pump light Lp from the branch line terminal equipment $40_1$ to the input terminal 14 of the optical branching equipment $44_1$ is also stopped, that is, the pump light supply to the optical limiter amplifier 29 of the next-stage optical branching equipment $44_2$ is stopped. In the optical branching equipment $44_2$ of the next stage, however, its optical limiter amplifier 29 need not be operative as long as the optical signal S is transmitted via the normal branching circuit; hence the suspension of the pump light supply does not matter. Further, the optical amplifying element 23 of the optical branching equipment $44_2$ is supplied with the pump light from the corresponding branch line terminal equipment $40_2$, and hence normally operates. In other words, during normal operation in which the optical branching equipment $44_1$ of FIG. 6 receives the optical signal S from the preceding stage (the trunk line terminal equipment $40_0$, in this case) and sends it to the succeeding stage via the branching circuit passing through the branch line terminal equipment $40_1$, the transmission of the optical signal S is normally kept on via the branching circuit, even if the supply of the pump light Lp from the preceding stage is suspended. When not excited by the pump light, the optical limiter amplifier 29 acts as an attenuator on the optical signal, and the level of the optical signal output via the short circuit is negligibly low. That is, the linear amplifying operation of the optical limiter amplifier 29 for the optical signal is needed only when trouble arises in the branch line optical cable $61_1$ or branch line terminal equipment $40_1$ connected to the optical branching equipment $44_1$. In the adjoining two optical branching equipments $44_1$ and $44_2$, when the supply of the pump light Lp from the branch line optical cables $61_1$ and $61_2$ connected thereto is suspended, the optical signal transmission via the trunk line is impossible, of course, but the probability of occurrence of such a situation is very small. As mentioned above, when not excited by the pump light, the erbium-doped fiber forming the optical limiter amplifier 29 or optical amplifying element 23 or 25 greatly attenuates the signal light.

As described above, each optical branching equipment in FIG. 6 has an arrangement in which the optical limiter amplifier 29 and the optical amplifying element 23 are excited by the pump light supplied via the optical signal transmission fiber from the preceding stage (at the side of the transmitting trunk line terminal equipment $40_0$), the optical amplifying element 25 is excited by one portion of the pump light supplied via the optical signal transmission fiber from the corresponding branch line terminal equipment, and the remaining pump light is supplied via the optical signal transmission fiber to the next stage (the receiving trunk line terminal equipment $40_3$ side in FIG. 4). However, each optical branching equipment may be arranged so that the pump light supplied from the branch line terminal equipment is applied to the preceding stage (the transmitting trunk line terminal equipment $40_0$ side). That is, for example, in the optical branching equipment $44_2$ in FIG. 6, the remaining portion of the pump light supplied to the optical amplifying element 23 from the branch line terminal equipment $40_2$ is applied from the optical divider 21 via the optical signal transmission fiber $33_1$ to the optical branching equipment $44_1$ for exciting its optical limiter amplifier 29 and optical amplifying element 25.

In either of the cases where the pump light is supplied from the optical branching equipment $44_1$ to $44_2$ in the same direction as is supplied the optical signal and the case where the pump light is supplied from the optical branching equipment $44_2$ to $44_1$ in the direction opposite from tee optical signal, the optical branching equipments $44_1$ and $44_2$ can each utilize the pump light supplied thereto when it is arranged so that the pump light supplied from the preceding or succeeding stage is used to excite the optical limiter amplifier 29 alone. For instance, in FIG. 6, when the pump light Lp is transmitted in the same direction as the optical signal S, such an optical divider of a wavelength characteristic that divides light in the wavelength band of the optical signal S and merely passes light in the wavelength band of the pump light Lp is formed, as the optical divider 21 of each optical branching equipment, by a directional coupler, for instance. In the case of transmitting the pump light Lp in the direction reverse from the direction of transmission of the optical signal S, such an optical coupler of a wavelength characteristic that couples two kinds of light in the wavelength band of the optical signal S and merely passes light in the wavelength band of the pump light Lp is formed, as the optical coupler 27 of each optical branching equipment, by a directional coupler, for example.

In either of the above-described cases, when a given branch line terminal equipment is installed near the corresponding optical branching equipment, it is possible, as referred to previously, to employ an arrangement in which either or both of the optical amplifying elements 25 and 23 of the optical branching equipment are omitted and the pump light Lp is entirely delivered from the coupler 27 or optical divider 21 to the optical branching equipment of the next or preceding stage. In such a case, the optical coupler $39_0$ or $39_1$ in the branch line terminal equipment is unnecessary.

Figure 7:
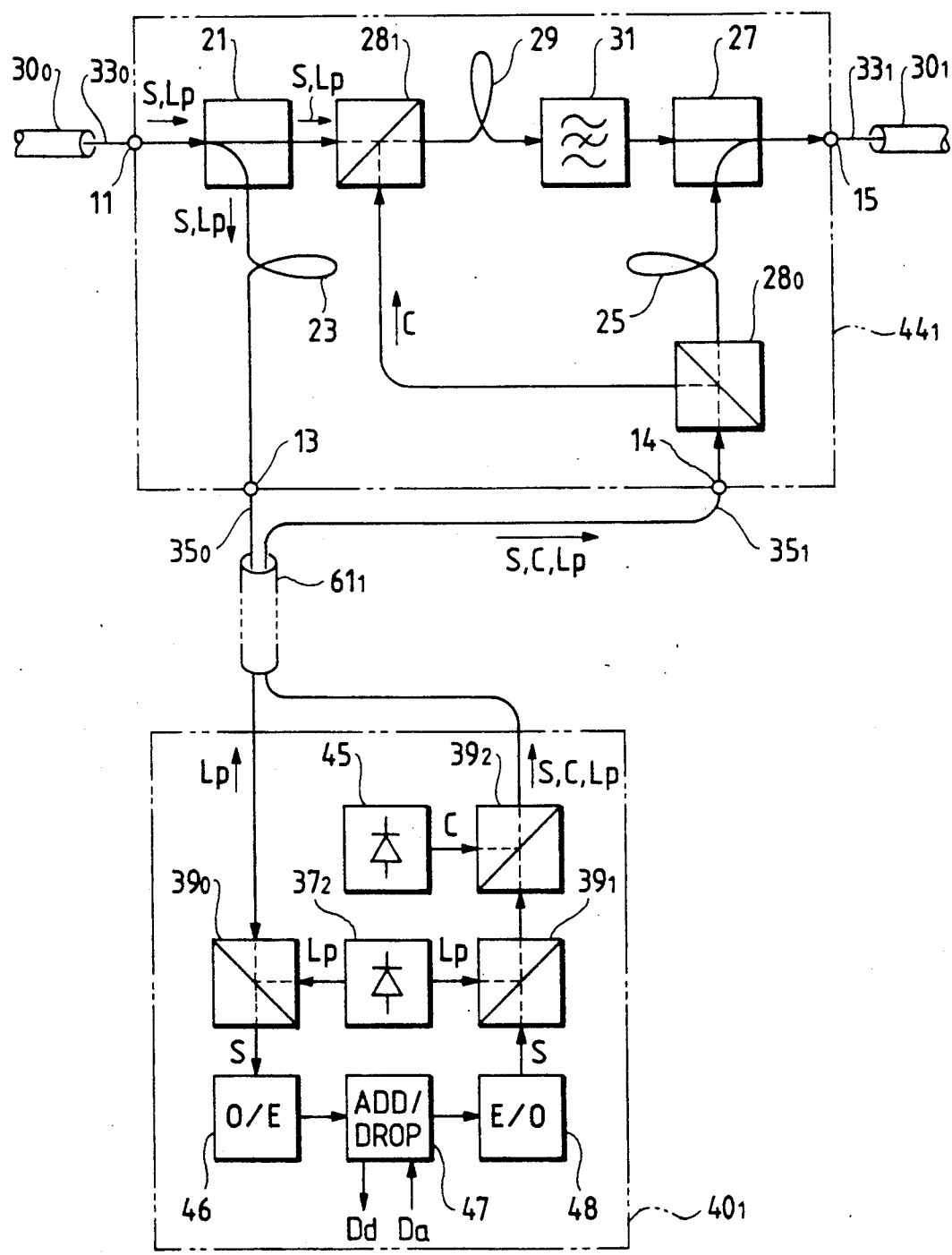
FIG. 7 is a block diagram illustrating another embodiment of the optical branching equipment of the present invention, together with branch line terminal equipment connected thereto.

FIG. 7 illustrates a modified form of the embodiment shown in FIG. 6. In this embodiment the control light transmission fiber is not provided in the branch line optical cable $61_1$ and the control light is transmitted using either one of the optical signal transmission fibers $35_0$ and $35_1$, the latter $35_1$ in this example. Accordingly, in the branch line terminal equipment $40_1$ the output optical signal S from the electrical/optical converter 48, the pump light Lp and the control light C are sequentially wavelength multiplexed in couplers $39_1$ and $39_2$ and then provided on the optical signal transmission fiber $35_1$. In the optical branching equipment $44_1$ the control light C is separated by an optical demultiplexing coupler $28_0$ from the wavelength-multiplexed input applied to the input terminal 14 and is provided to a coupler $28_1$, the remaining optical signal S and the pump light Lp are being input into the optical amplifying element 25. This embodiment is identical in construction and operation with the FIG. 6 embodiment except for the above, and hence no further description will be given.

Figure 8:
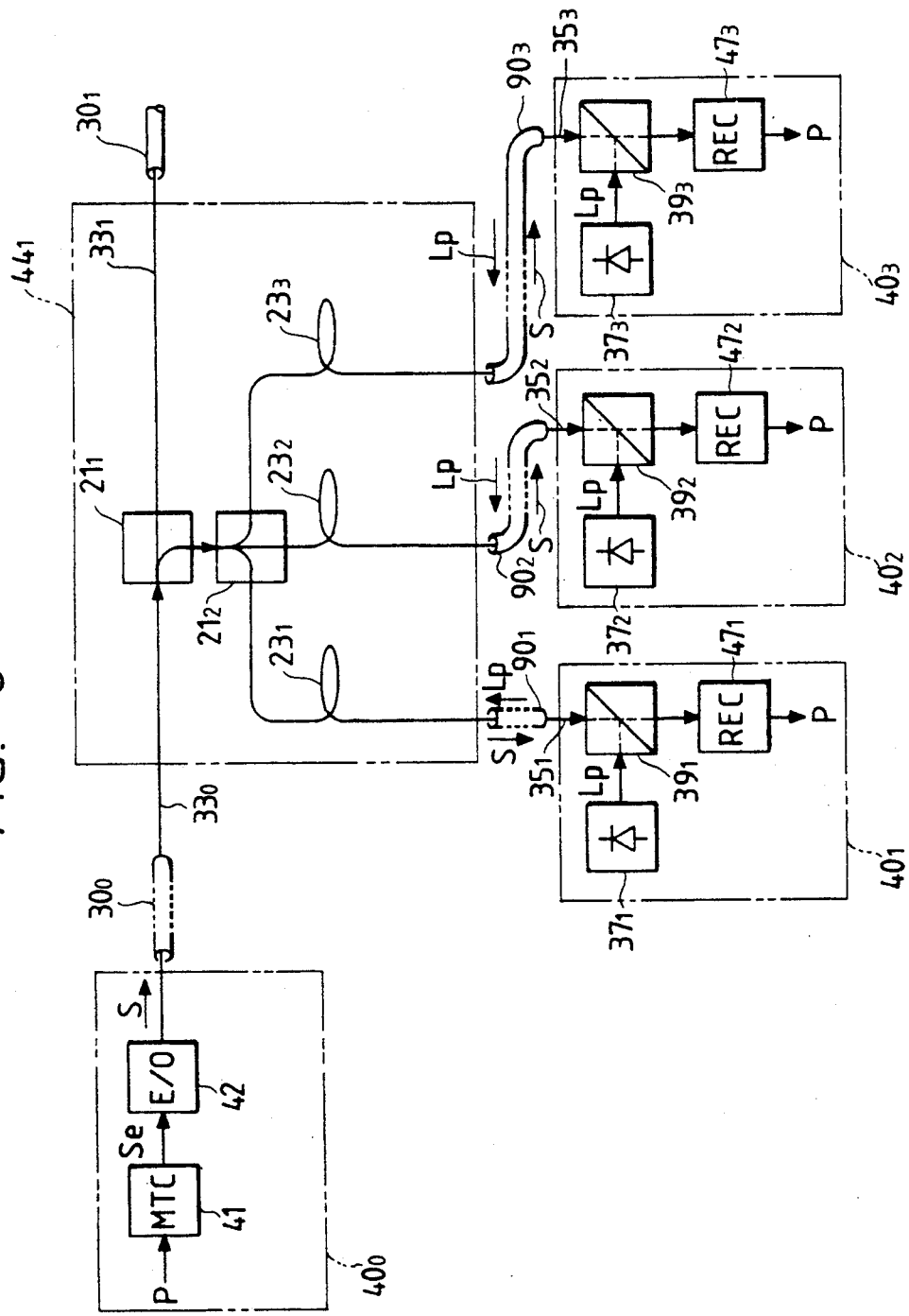
FIG. 8 is a block diagram illustrating another embodiment of the optical network of the present invention.

FIG. 8 illustrates an embodiment of the optical network according to the second aspect of the present invention. In the trunk line terminal equipment $40_0$ the electrical signal Se from the matching circuit 41 is converted by the electrical/optical converter 42 into the optical signal S, which is provided on the optical signal transmission fiber $33_0$ accommodated in the trunk line optical cable $30_0$. In the optical branching equipment $44_1$ the signal light S transmitted thereto is divided by an optical divider $21_1$ into two, one of which is applied to the optical fiber $33_1$ of the trunk line optical cable $30_1$ and the other of which is provided to an optical divider $21_2$, by which it is subdivided into a plurality of optical signals, three in this example. The three optical signals S are amplified by optical amplifying elements $23_1$, $23_2$ and $23_3$, respectively, and the thus amplified optical signals S are supplied to branch line terminal equipments $40_1$, $40_2$ and $40_3$ via optical signal transmission fibers $35_1$, $35_2$ and $35_3$ of branch line optical fiber cables $90_1$, $90_2$ and $90_3$. In this example the branch line terminal equipments $40_1$, $40_2$ and $40_3$ are shown only to receive information, and the supplied optical signals S are converted by receivers $47_1$, $47_2$ and $47_3$ into electrical signals, from which desired information P is extracted. Also in this embodiment the optical amplifying elements $23_1$, $23_2$ and $23_3$ of the optical branching equipment $44_1$ are each formed by an erbium-doped fiber, for example, and the wavelength band of each optical signal is selected to be 1.55 $\mu$m, for instance. The pump light Lp as of a wavelength band 1.48 $\mu$m for exciting the optical amplifying elements $23_1$, $23_2$ and $23_3$ is produced by each of pump light sources $37_1$, $37_2$ and $37_3$ in the branch line terminal equipments $40_1$, $40_2$ and $40_3$ and supplied via optical couplers $39_1$, $39_2$ and $39_3$ and optical signal transmission fibers $35_1$, $35_2$ and $35_3$, respectively. It is therefore possible to constitute optical branching equipment which has capabilities of branching, amplifying and transmitting an optical signal to branch line terminal equipment without employing electrically active devices; hence the optical branching equipment is highly reliable in operation and maintenance-free for a long period of time.

Figure 9:
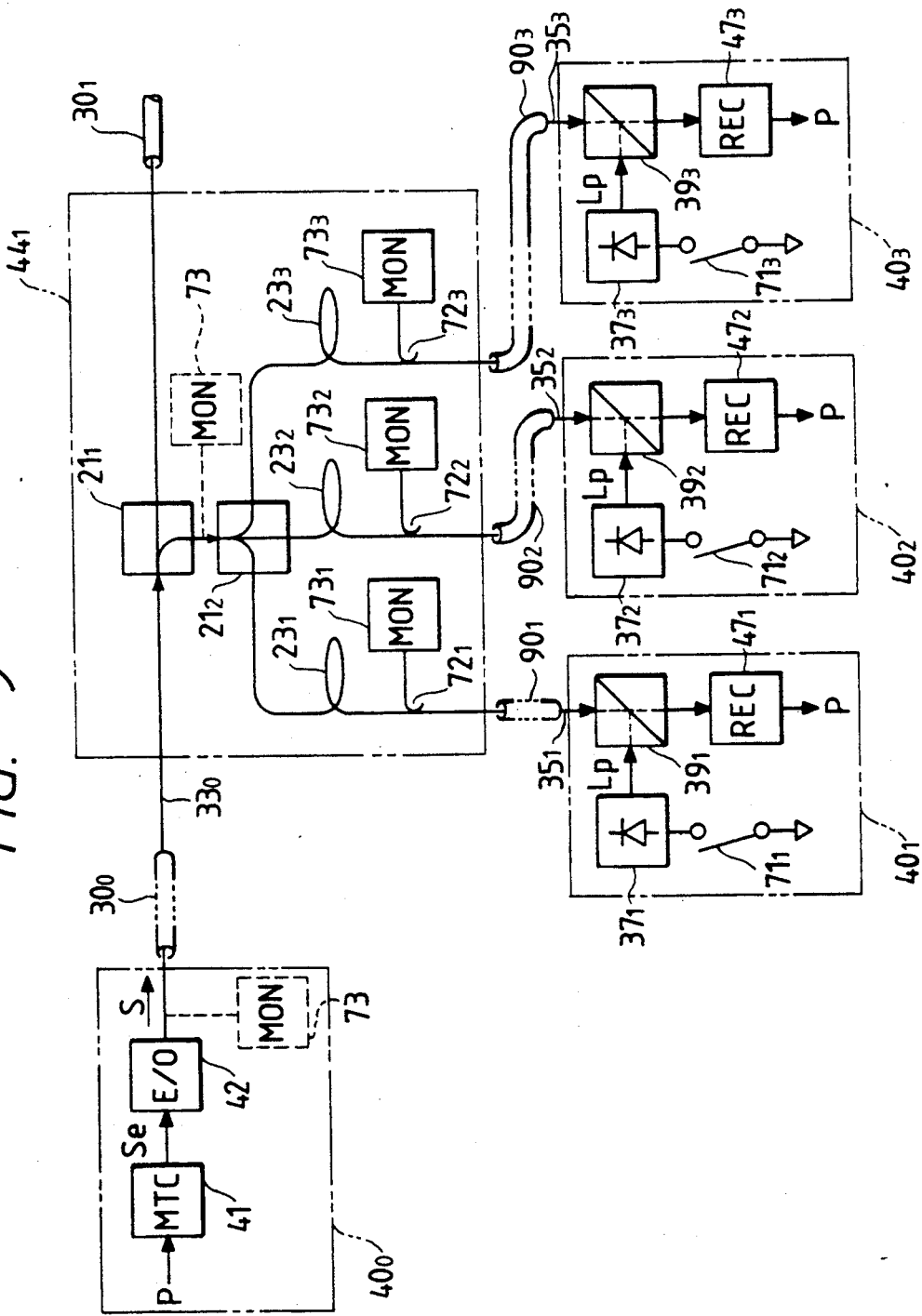
FIG. 9 is a block diagram showing a modified form of the optical network depicted in FIG. 8.

Incidentally, the optical network shown in FIG. 8 is applicable to an optical fiber video delivery system. FIG. 9 illustrates the construction of the optical network in such a case. For instance, the trunk line terminal equipment $40_0$ is an information providing station and delivers a program P as an optical signal S, and the branch line terminal equipments $40_1$, $40_2$ and $40_3$ are subscriber-furnished terminal equipments and receive the program P. In this case, at a desired time of receiving the program P, the respective subscriber-furnished terminal equipments start the pump light sources $37_1$, $37_2$ and $37_3$ by start switches $71_1$, $71_2$ and $71_3$ to supply the pump light Lp to the corresponding optical amplifying elements $23_1$, $23_2$ and $23_3$ of the optical branching equipment $44_1$. In the optical branching equipment $44_1$ there are provided optical couplers $72_1$, $72_2$ and $72_3$ loosely coupled with the optical fibers $35_1$, $35_2$ and $35_3$, respectively, in the wavelength band of the pump light Lp and monitoring equipments $73_1$, $73_2$ and $73_3$ respectively connected to the optical couplers $72_1$, $72_2$ and $72_3$. When supplied with the pump light Lp from the subscriber-furnished terminal equipments via the optical fibers $35_1$, $35_2$ and $35_3$ of branch line optical cables $90_1$, $90_2$ and $90_3$, the monitoring equipments $73_1$, $73_2$ and $73_3$ detect the pump light Lp to thereby learn the state of utilization of the program P by the subscriber-furnished terminal equipments.

Figure 10:
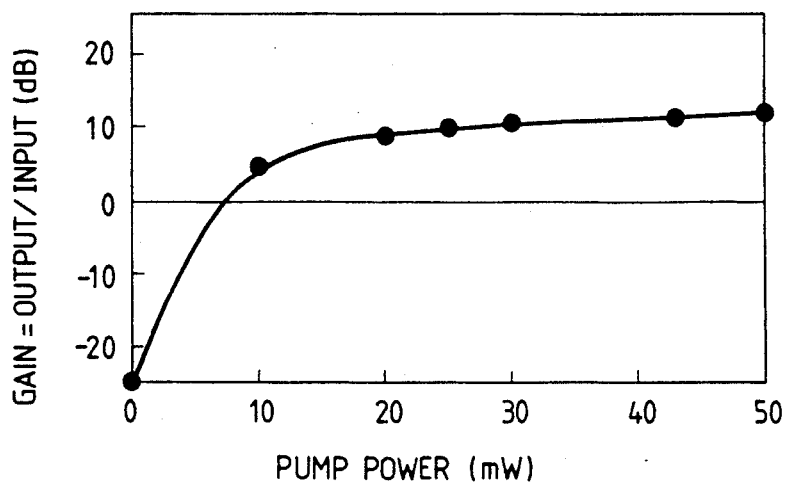
FIG. 10 is a graph showing another characteristic of the optical amplifying element formed by the erbium-doped fiber.

FIG. 10 shows the relationship between the gain of the optical amplifying element formed by the erbium-doped fiber and the power of the pump light. As shown in FIG. 10, when the power of the pump light becomes smaller than a certain value, the gain becomes smaller than 0 dB, and as mentioned previously, when no pump light is provided, the optical amplifying element greatly attenuates the input signal light. Accordingly, in the optical network depicted in FIG. 9, the pump light must be supplied to the optical amplifying elements $23_1$, $23_2$ and $23_3$ of the optical branching equipment $44_1$ in order for the subscriber-furnished terminal equipments to receive the program. The monitoring equipments $73_1$, $73_2$ and $73_3$ monitor the state of use of the program by the subscriber-furnished terminal equipments through the detection of the pump light.

While in FIG. 9 the monitoring equipments $73_1$, $73_2$ and $73_3$ are shown to be connected to the optical fibers $35_1$, $35_2$ and $35_3$ of the respective branch line optical cables, respectively, they need not always be provided separately. For example, as indicated by the broken line, one monitoring equipment 73 may be provided in association with the optical path between the optical dividers $21_1$ and $21_2$, or it may be provided, for instance, in association with the optical fiber $33_0$ in the trunk line terminal equipment $40_0$ so that it detects the pump light remaining after being consumed in the optical amplifying elements $23_1$, $23_2$ and $23_3$. In these cases, the subscriber-furnished terminal equipments (i.e. the branch line terminal equipments) $40_1$, $40_2$ and $40_3$ are each adapted to deliver the pump light after modulating it with a modulation signal of a particular frequency or code of its own and the monitoring equipment 73 demodulates the modulation signal of the pump light to thereby detect which of the subscriber-furnished terminal equipments supplies the pump light.

Figure 11:
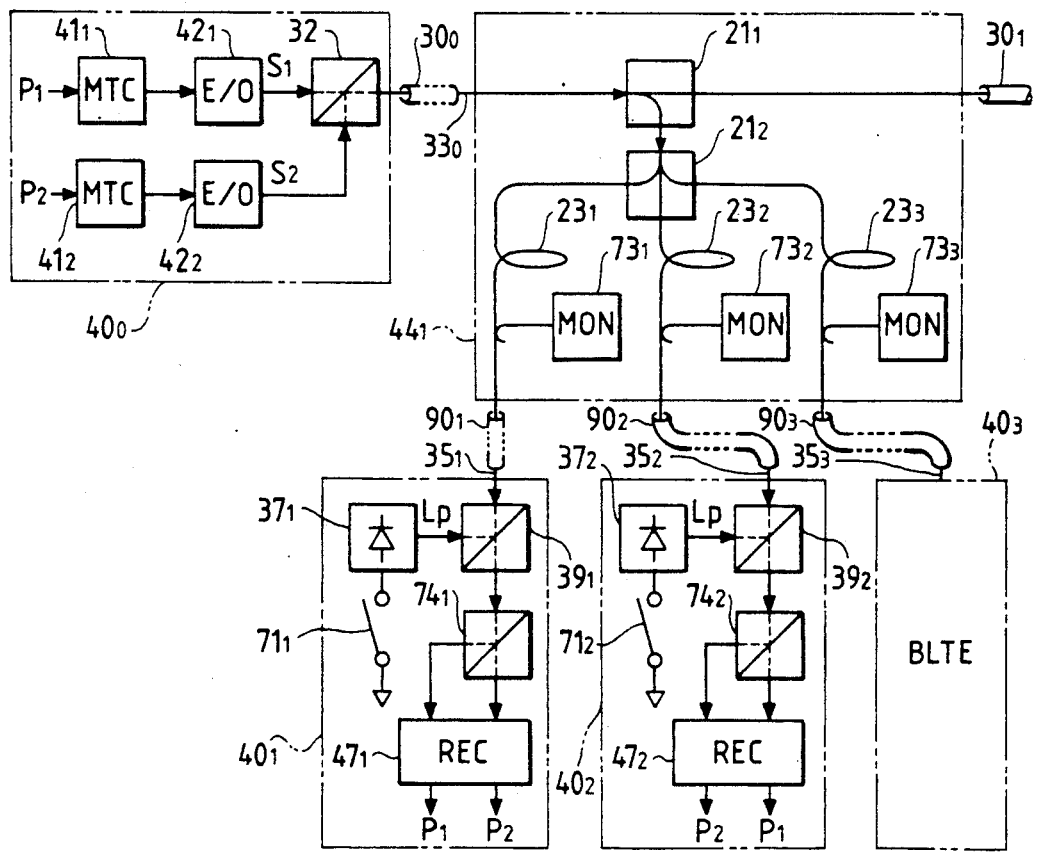
FIG. 11 is a block diagram illustrating a modification of the optical network shown in FIG. 9.

FIG. 11 illustrates a modified form of the optical network applied to the optical fiber video delivery system shown in FIG. 9. This embodiment is designed to offer two kinds of information to subscribers through utilization of the fact that since the transmission loss by silica fiber and erbium-doped fiber is very small at a wavelength of 1.3 μm and this wavelength is outside the energy transition absorption wavelength band of the erbium-doped fiber, no light of 1.3 μm is absorbed by erbium-doped silica fiber in either of its excited and non-excited states. That is, in the trunk line terminal equipment (i.e. information providing station) $40_0$ program information $P_1$ input to a matching circuit $41_1$ is converted by an electrical/optical converter $42_1$ into an optical signal $S_1$ of a 1.55 μm wavelength and control information or service information $P_2$ input to a matching circuit $41_2$ is converted by an electrical/optical converter $42_2$ into an optical signal $S_2$ of a 1.3 μm wavelength. These optical signals $S_1$ and $S_2$ are wavelength multiplexed by the coupler 32 and then provided on the optical signal transmission fiber $33_0$. The branch line terminal equipment (i.e. the subscriber-furnished terminal equipment) $40_1$ is always supplied with the optical signal $S_2$ of the 1.3 μm wavelength regardless of whether or not it delivers the pump light Lp, and the optical signal $S_2$ is separated by a demultiplexing coupler $74_1$ and applied to the receiver $47_1$, by which the service information $P_2$ can be regenerated. On the other hand, the optical signal $S_1$ of the 1.55 μm wavelength is supplied from the optical branching equipment $44_1$ to the branch line terminal equipment $40_1$ only when the pump light Lp emanating from the pump light source $37_1$ started by the start switch $71_1$ is supplied to the optical amplifying element $23_1$ of the optical branching equipment $44_1$, and the optical signal $S_1$ is applied to the receiver $47_1$, by which the program information $P_1$ can be regenerated.

Incidentally, if the two optical signals $S_1$ and $S_2$ are subjected to different but proper premodulations, then the two electrical signals corresponding to these optical signals could easily be separated from each other, and consequently, the demultiplexing coupler $74_1$ would be unnecessary. Assuming, for example, that the first optical signal $S_1$ is obtained by frequency modulating a carrier $F_1$ of a frequency $f_1$ with a first electrical signal to be transmitted and then by converting the modulated carrier into the optical signal $S_1$ and that the second optical signal $S_2$ is similarly obtained by frequency modulating a carrier $F_2$ of a frequency $f_2$ with a second electrical signal to be transmitted and then by converting the modulated carrier into the optical signal $S_2$, an electrical signal containing the modulated carriers $F_1$ and $F_2$ of the frequencies $f_1$ and $f_2$ can be obtained by converting the multiplexed first and second optical signals $S_1$ and $S_2$ into electrical form without separating them from each other. Accordingly, by frequency discrimination of the received electrical signals through use of a local oscillation signal of either one of the frequencies $f_1$ and $f_2$, the desired one of the first and second electrical signals can be obtained.

With the construction shown in FIG. 11, the trunk line terminal equipment $40_0$ delivers, by the optical signal of the 1.55 μm band, for example, charging program information $P_1$ for which subscribers are charged in accordance with the amount of viewing time, and delivers, by the optical signal $S_2$ of the 1.3 μm band, basic service information $P_2$ such as control information of the branch line terminal equipments $40_1$, $40_2$ and $40_3$, introduction of the contents of the charging program information, and an advertisement. The subscribers monitor the information $P_2$ reproduced from the optical signal $S_2$ of the 1.3 μm band and, if they find desired information, they send out the pump light Lp by starting the pump light sources $37_1$, $37_2$ and $37_3$ with the start switches $71_1$, $71_2$ and $71_3$, by which they can receive the optical signal $S_1$ of the 1.55 μm band. Accordingly, the subscribers are allowed to make a choice of information without being charged, and the information provider is allowed to advertise the information he provides; therefore, this optical network is highly beneficial to both of them. Also in this embodiment the monitoring equipment 73 may be provided at the position indicated by the broken line in FIG. 9 instead of using the monitoring equipments $73_1$, $73_2$ and $73_1$.

Figure 12:
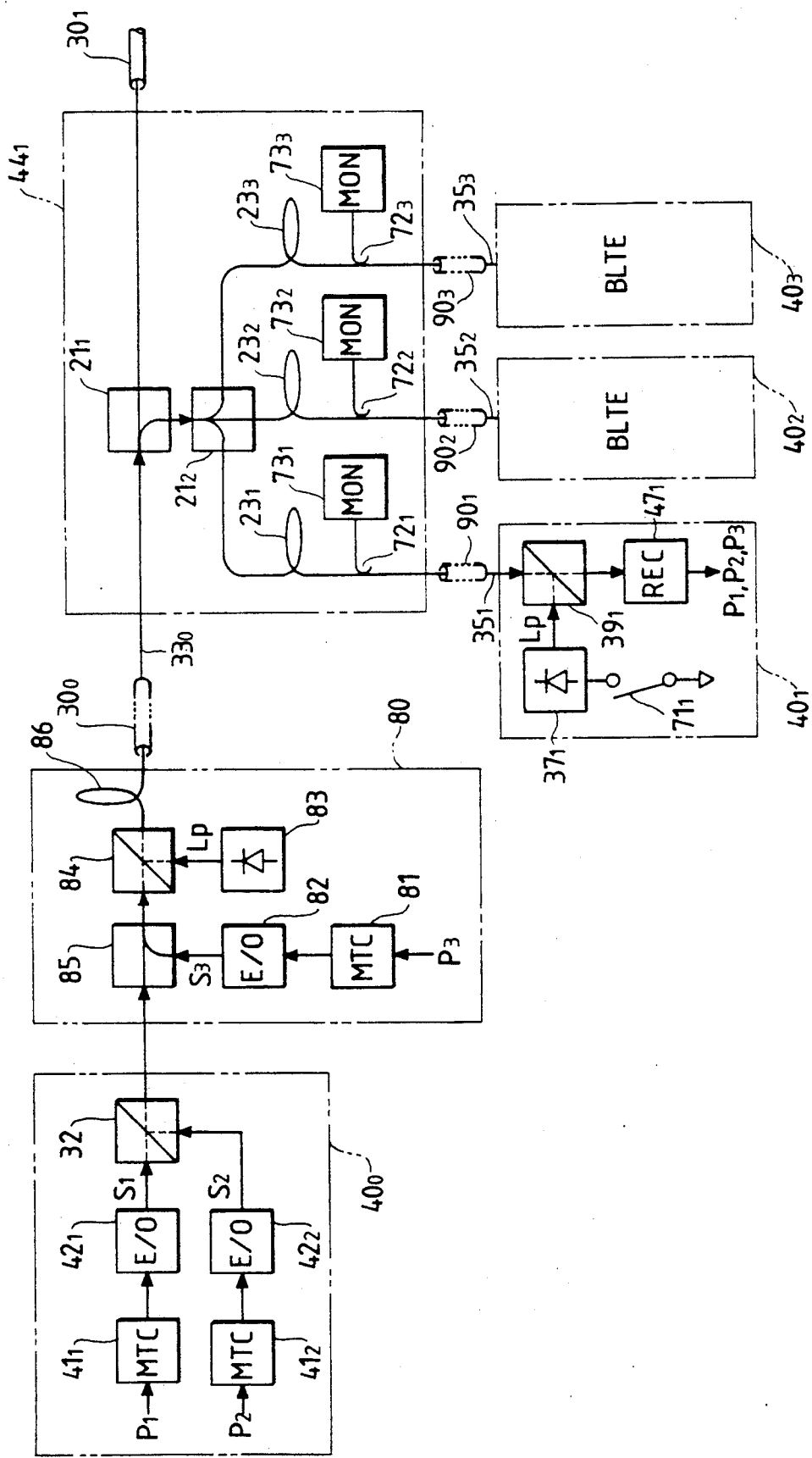
FIG. 12 is a block diagram illustrating a modified form of the optical network shown in FIG. 11.

FIG. 12 illustrates a modified form of the optical network of FIG. 11, in which another facility is added. This embodiment utilizes the characteristics of the erbium-doped fiber referred to previously in respect of FIG. 3. When the information providing equipment $40_0$ is transmnitting the program information $P_1$ by the first optical signal $S_1$, supervisory station 80 may couple, by an optical coupler 85, a third optical signal $S_3$ of high power to the first optical signal $S_1$ and provides the signals to an optical limiter amplifier 86, by which it is possible to suppress the first optical signal $S_1$ by the third optical signal $S_3$, temporarily interrupting the program information $P_1$ with program information $P_3$. That is, assume that the information providing equipment $40_0$ always delivers the program information $P_1$ and the service information $P_2$ by the optical signal $S_1$ of the 1.55 μm wavelength and the optical signal $S_2$ of the 1.3 μm. A matching circuit 81 converts emergency information $P_3$, input thereinto as required, into a drive signal and applies it to an electrical/optical converter 82, which responds thereto to output the high-power optical signal $S_3$ of the same wavelength 1.55 μm as that of the first optical signal $S_1$. The optical signal $S_3$ is coupled with the optical signals $S_1$ and $S_2$ from the information providing station $40_0$ and input into the optical limiter amplifier 86 via a coupler 84. The optical limiter amplifier 86, which is supplied with the pump light Lp from a pump light source 83 via the coupler 84, normally amplifies the optical signal $S_1$ and delivers it and the optical signal $S_2$ to the optical branching equipment $44_1$ via the optical signal transmission fiber $33_0$. If the optical signal $S_3$ of high power is input into the optical limiter amplifier 86, the optical signal $S_1$ is suppressed and the optical signal $S_3$ is output instead of the optical signal $S_1$. Accordingly, the optical signal $S_1$ supplied to the optical branching equipment $44_1$ until then is switched to the optical signal $S_3$. Incidentally, the optical signal $S_2$ of the 1.3 μm passes through the optical limiter amplifier 86 regardless of its operation state and is always supplied to the optical branching equipment $44_1$.

With the structure shown in FIG. 12, the supervisory station 80 is allowed to interrupt, as required, the optical signal $S_1$ from the information providing station $40_0$ by the optical signal $S_3$ for supply to the optical branching equipment $44_1$. Consequently, only those subscriber-furnished terminal equipments $40_1$, $40_2$ and $40_3$ that are supplying the pump light Lp to the optical branching equipment $44_1$ and receiving the optical signal $S_1$ at that time receive the optical signal $S_3$. This interrupt function can be utilized for an emergency warning, for example.

Figure 13:
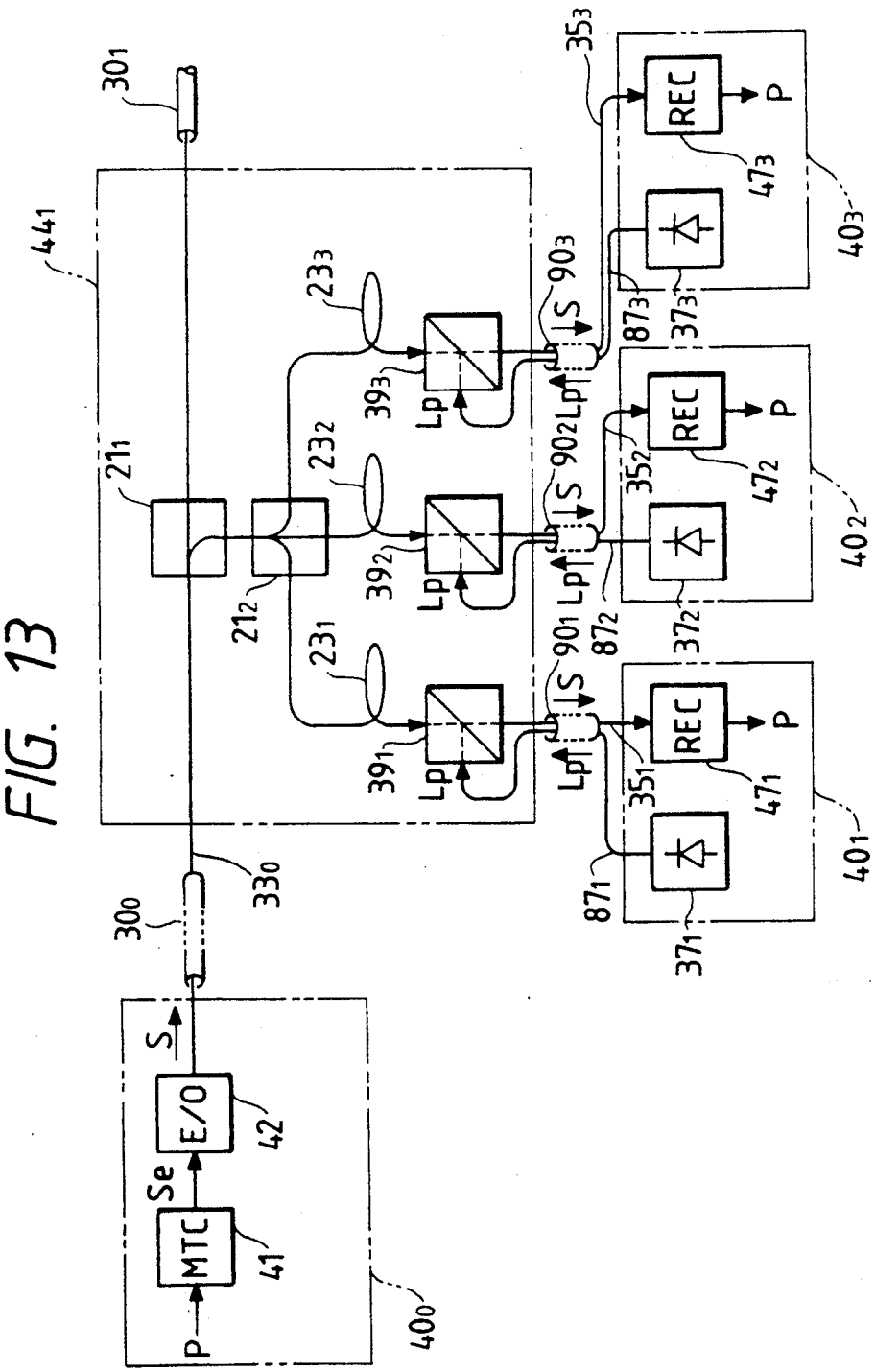
FIG. 13 is a block diagram illustrating a modified form of the optical network shown in FIG. 8.

Although in the embodiments shown in FIGS. 8, 9, 11 and 12 the pump light Lp from the branch line terminal equipments $40_1$ to $40_3$ is supplied via the optical signal transmission fibers $35_1$ to $35_3$ to the corresponding optical amplifying elements $23_1$ to $23_3$ of the optical branching equipment $44_1$, it is obvious that the pump light Lp may be supplied to the optical branching equipment $44_1$ via pump light transmission fibers which are provided along the optical fibers $35_1$ to $35_3$. FIG. 13 illustrates an embodiment of this construction as applied to the optical network of FIG. 8. As depicted in FIG. 13, the branch line optical cables $90_1$ to $90_3$ have accommodated therein pump light transmission fibers $87_1$ to $87_3$ along the optical signal transmission fibers $35_1$ to $35_3$. The pump light Lp from the pump light sources $37_1$ to $37_3$ in the branch line terminal equipments $40_1$ to $40_3$ is input into the pump light transmission fibers $87_1$ to $87_3$ and transmitted therethrough to the optical branching equipment $44_1$. In the branching circuits of the optical branching equipment $44_1$ there are inserted optical couplers $39_1$ to $39_3$, through which the pump light Lp supplied thereto via the pump light transmission fibers $87_1$ to $87_3$ is input into the optical amplifying elements $23_1$ to $23_3$ in the respective branching circuits, exciting them. The optical signals S amplified by the optical amplifying elements $23_1$ to $23_3$ are transmitted to the branch line terminal equipments $40_1$ to $40_3$ via the optical couplers $39_1$ to $39_3$ and the optical signal transmission fibers $35_1$ to $35_3$, respectively. This construction can be applied as well to the embodiments shown in FIGS. 9, 11 and 12.

While in the embodiments of FIGS. 9; 11, 12 and 13 an optical signal of 1.55 μm wavelength is employed as the optical signal $S_1$, an optical signal of 1.535 μm may also be used. In the embodiment of FIG. 12 the wavelengths of the optical signals $S_1$ and $S_3$ may be different from each other. Also in these embodiments optical signals of wavelengths different from those mentioned above can be employed by using, as the optical amplifying elements and optical limiter amplifiers, optical fibers doped with other rare earth elements.

As described above, according to the second aspect of the present invention, since the optical branching equipment between the trunk line terminal equipment and the branch line terminal equipments is provided with optical amplifying elements which amplify an optical signal when supplied with pump light of a specified wavelength, the optical signal can be distributed to many branch line terminals. Besides, since electronic devices which call for electric power supply are not needed in the optical transmission line from the trunk line terminal equipment to the branch line terminal equipment, no maintenance is required for a long period of time; hence the present invention is highly reliable and highly economical.

What is claimed is:

1. Optical branching equipment comprising:
a trunk line optical signal input terminal into which an optical signal of a first wavelength band is input from a trunk line;
a trunk line optical signal output terminal from which an optical signal of said first wavelength band is output to said trunk line;
a branch line optical signal output terminal from which an optical signal of said first wavelength band is output to a branch line;
a branch line optical signal input terminal into which an optical signal of said first wavelength is input from said branch line;
optical divider means which has an input port and first and second output ports and whereby light input into said input port optically connected to said trunk line optical signal input terminal is divided for output to said first and second output ports;
optical coupling means which has first and second input ports and an output port and whereby light input into either of said first and second input ports is output to said output port optically connected to said trunk line optical signal output terminal;
a short circuit for optically interconnecting said first output port of said optical dividing means and said first input port of said optical coupling means;
a first branching circuit for optically interconnecting said second output port of said optical divider means and said branch line optical signal output terminal;
a second branching circuit for optically interconnecting said second input port of said optical coupling means and said branch line optical signal input terminal;
optical limiter amplifier means inserted in said short circuit, for limiting and amplifying light of said first and second wavelength bands;
control light input means optically connected to said optical limiter amplifier means, whereby control light supplied from said branch line and of a second wavelength band different from said first wavelength band is input into said optical limiter amplifier means; and pump light supply means supplied with power from said trunk line, for supplying pump light to said optical limiter amplifier means to excite it;

wherein when being supplied with said control light, said optical limiter amplifier means excited by said pump light suppresses an optical signal of said first wavelength band to thereby substantially cut off said short circuit for said optical signal and, when not supplied with said control light, amplifies and outputs said optical signal.

2. The optical branching equipment of claim 1, wherein said pump light supply means includes: a pump light source supplied with electrical power from said trunk line, for generating said pump light; and pump light input means for optically interconnecting said pump light source and said optical limiter amplifier means to input said pump light into said optical limiter amplifier means.

3. The optical branching equipment of claim 1, wherein said pump light supply means includes pump light input means which is supplied with said pump light as said power from said trunk line and inputs said pump light to said optical limiter amplifier means.

4. The optical branching equipment of claim 1, wherein said optical limiter amplifier means includes a rare earth doped fiber.

5. The optical branching equipment of claim 1, wherein an optical amplifying element is inserted in at least one of said first and second branching circuits, for amplifying an optical signal of said first wavelength band.

6. The optical branching equipment of claim 1, wherein optical filter which blocks light of said second wavelength but passes therethrough at least an optical signal of said first wavelength band is inserted in said short circuit between said optical limiter amplifier means and said first input port of said optical coupling means.

7. The optical branching equipment of claim 2, wherein an optical amplifying element for amplifying an optical signal of said first wavelength band is inserted in at least one of said first and second branching circuits.

8. The optical branching equipment of claim 7, wherein said pump light supply means includes means for supplying said pump light from said pump light source to said optical amplifying element.

9. The optical branching equipment of claim 3, wherein said pump light supply means includes: pump light input terminal into which said pump light is input from said trunk line; and pump light input means which is disposed in said short circuit, receives said pump light from said pump light input terminal and inputs said pump light into said optical limiter amplifier means.

10. The optical branching equipment of claim 3, wherein said pump light input means is means whereby said pump light supplied from said trunk line is input into said optical limiter amplifier means via one of said optical divider means and said optical coupling means.

11. The optical branching equipment of claim 3, wherein an amplifying element is inserted in at least one of said first and second branching circuits, for amplifying an optical signal of said first wavelength band.

12. The optical branching equipment of claim 7 or 11, wherein said optical amplifying means is excited by another pump light which is supplied from that one of said first and second branching circuits in which said optical amplifying element is inserted.

13. The optical branching equipment of claim 10, wherein said branch line input terminal includes means which is supplied with another pump light via said branch line and delivers said another pump light to said trunk line via the other of said optical divider means and said optical coupling means.

14. The optical branching equipment of claim 1, wherein either one of said branch line optical signal input terminal and said branch line optical signal output terminal serves also as branch line control light input terminal for receiving said control light from said branch line, and wherein said control light input means is means whereby said control light is extracted from the corresponding one of said first and second branching circuits and inputs said control light into said optical limiter amplifier means.

15. An optical network comprising:
a trunk line optical fiber cable having accommodating therein an optical signal transmission fiber for transmitting an optical signal;
trunk line terminal equipment connected to said trunk line, for generating and providing an optical signal of a first wavelength band to said optical signal transmission fiber of said trunk line optical fiber cable;
at least one optical branching equipment which is inserted in said trunk line optical fiber cable and has an input/output branching circuit and a short circuit and whereby said optical signal of the first wavelength band received from said optical signal transmission fiber of said trunk line optical fiber cable at the input side thereof is normally provided via said input/output branching circuit to said optical signal transmission fiber of said trunk line optical fiber cable at the output side thereof;
a branch line optical fiber cable having accommodated therein an input/output optical signal transmission fiber connected to said input/output branching circuit of said optical branching equipment; and
branch line terminal equipment which is connected to said branch line optical fiber cable, receives said optical signal of the first wavelength band from said input/output optical signal transmission fiber, subjects said optical signal to information add/drop processing and then provides said optical signal to said optical branching equipment via said input/output optical signal transmission fiber of said branch line optical fiber cable;
wherein said branch terminal equipment comprises control light source means for generating control light of a second wavelength band different from said first wavelength band and for supplying said control light of the second wavelength band to said optical branching equipment via said branch line optical fiber cable;
wherein said optical branching equipment includes: optical limiter amplifier means inserted in said short circuit and capable of amplifying light of said first and second wavelength bands; pump light supply means supplied with power from said trunk line optical fiber cable, for supplying pump light to said optical limiter amplifier means; and control light input means for inputting said control light from said branch line terminal equipment into said optical limiter amplifier means; and
wherein when being supplied with said control light, said optical limiter amplifier means suppresses said optical signal of the first wavelength band received from said optical signal transmission fiber of said trunk line optical fiber cable at the input side thereof to thereby substantially cut off said short circuit for said optical signal of the first wavelength band and, when not supplied with said control light, said optical limiter amplifier amplifies and provides said optical signal of the first wavelength band to said optical signal transmission fiber of the trunk line optical fiber cable at the output side thereof.

16. The optical network of claim 15, wherein said trunk line optical fiber cable accommodates a feed line, and wherein said pump light supply means includes a pump light source which generates said pump light by electrical power supplied thereto from said feed line.

17. The optical network of claim 15, wherein said pump light supply means includes pump light input means which is supplied with said pump light, as said power, from said trunk line optical fiber cable and inputs said pump light into said optical limiter amplifier means.

18. The optical network of claim 15, wherein optical amplifying means is inserted in said input/output branching circuit, for amplifying said optical signal of the first wavelength band.

19. The optical network of claim 16, wherein optical amplifying means is inserted in said input/output branching circuit, for amplifying said optical signal of the first wavelength band.

20. The optical network of claim 19, wherein said pump light supply means includes means for supplying said pump light from said pump light source to said optical amplifying means.

21. The optical network of claim 17, wherein said pump light input means is means for inputting said pump light from said trunk line into said optical limiter amplifier means via said short circuit.

22. The optical network of claim 17, wherein optical amplifying means is inserted in said input/output branching circuit, for amplifying said optical signal of the first wavelength band.

23. The optical network of claim 19 or 22, wherein said branch line terminal equipment has a pump light source for generating another pump light for supply to said optical branching equipment via said input/output optical signal transmission fiber of said branch line optical fiber cable, and wherein said optical amplifying means of said optical branching equipment is excited by said another pump light supplied thereto from said branch line terminal equipment via said input/output branching circuit.

24. The optical network of claim 21, wherein said branch line terminal equipment has pump light source for generating another pump light for supply to said optical branching equipment via said input/output optical signal transmission fiber of said branch line optical fiber cable, and wherein said optical branching equipment includes means for delivering said another pump light from said branch line terminal equipment via said input/output branching circuit to said optical signal transmission fiber of said trunk line optical fiber cable.

25. The optical network of claim 15, wherein said control light is supplied to said optical branching equipment via control light transmission fiber accommodated in said branch line optical fiber cable.

26. The optical network of claim 15, wherein said control light is supplied to said optical branching equipment via one of said input and output optical signal transmission fibers of said branch line optical fiber cable, and wherein said control light input means is means for extracting said control light from the corresponding one of said input and output branching circuits and inputting said control light into said optical limiter amplifier means.

27. The optical network of claim 15, wherein said optical limiter amplifier means includes an erbium-doped fiber, and wherein said first and second wavelength bands are about 1.55 and 1.535 μm, respectively, and the wavelength band of said control light is about 1.48 μm.

28. An optical network comprising:
a trunk line optical fiber cable having accommodated therein an optical signal transmission fiber;
trunk line terminal equipment including optical signal generator which is connected to said trunk line optical fiber cable and generates an optical signal of a first wavelength band and provides said optical signal to said optical signal transmission fiber of said trunk line optical fiber cable;
at least one optical branching equipment optically connected to said optical signal transmission fiber of said trunk line optical fiber cable, said optical branching equipment including optical dividing means for taking in at least one portion of said optical signal from said optical signal transmission fiber, dividing said one portion of said optical signal into a plurality of optical signals and outputting them to individual optical branching circuits, and optical amplifying elements inserted in said optical branching circuits and each supplied with one of said divided optical signals, each of said optical amplifying elements, when excited by pump light of a wavelength band different from said first wavelength band, amplifying and outputting said optical signal of the first wavelength band, but when not supplied with said pump light, said each optical amplifying element attenuating said optical signal of the first wavelength band;
branch line optical fiber cables having branch line optical signal transmission fibers connected to output terminals of said branching circuits of said optical branching equipment, respectively;
branch line terminal equipments connected to said branch line optical fiber cables, respectively;
a pump light source provided in each of said branch line terminal equipment, for generating said pump light;
pump light supply means for supplying said pump light from said pump light source to the corresponding one of said optical amplifying elements of said optical branching equipment via said branch line optical fiber cable; and
a branch line terminal equipment receiver provided in each of said branch line terminal equipments, for receiving said optical signal of the first wavelength supplied from said branch line optical fiber to regenerate information.

29. The optical network of claim 28, wherein each of said pump light supply means includes pump light coupling means which is provided in each of said branch terminal equipments and optically couples said pump light from said pump light source with said branch line optical signal transmission fiber, whereby said pump light is input into said optical amplifying element of the corresponding branching circuit of said optical branching equipment via said branch line optical signal transmission fiber.

30. The optical network of claim 28, wherein said pump light supply means includes: a pump light transmission fiber provided along said branch line optical signal transmission fiber in each of said branch line optical fiber cables, for transmitting said pump light from said pump light source; and pump light coupling means inserted in the corresponding one of said branching circuits of said optical branching equipment, for inputting said pump light from said pump light transmission fiber into said optical amplifying element.

31. The optical network of claim 28, wherein each of said branch terminal equipments includes starting means for starting said pump light source, and wherein said optical branching equipment includes means optically coupled with each of said branching circuits, for detecting said pump light.

32. The optical network of claim 28, wherein said each branch line terminal equipment includes starting means for starting said pump light source, wherein said pump light source generates said pump light modulated by a modulation signals representing said each branch terminal equipment, and wherein pump light detecting means is provided which is optically coupled with said optical signal transmission fiber of said trunk line optical cable, for detecting said modulated pump light.

33. The optical network of claim 28, 29, 30, 31, or 32, wherein said trunk line terminal equipment comprises a second wavelength optical signal generator for generating an optical signal of a second wavelength outside the energy transition absorption band of said each optical amplifying element of said optical branching equipment, and optical signal coupling means for wavelength multiplexing said optical signals of the first and second wavelengths and providing them to said optical signal transmission fiber of said trunk line optical fiber cable.

34. The optical network of claim 33, wherein said each optical amplifying element of said optical branching equipment is an erbium-doped fiber, and wherein said first wavelength band is in the range of about 1.53 to 1.56 $\mu$m and said second wavelength band is about 1.3 $\mu$m.

35. The optical network of claim 28, 29, 30, 31, or 32, further including: a high-power optical signal generator for generating a high-power optical signal of said second wavelength band and sufficiently higher than the optical signal power of said first wavelength band; optical signal coupling means for coupling said optical signal of said first wavelength band from said trunk line terminal equipment and said high-power optical signal of said second wavelength band; and optical limiter amplifier means which is excited by pump light to amplify the output light from said optical coupling means and provides the amplified output light to said optical signal transmission fiber of said trunk line optical fiber cable, said optical limiter amplifier means, when supplied with said high-power optical signal of said second wavelength band, operates to suppress the level of said optical signal of said first wavelength band.

36. The optical network of claim 35, wherein said optical amplifying elements and said optical limiter amplifier means are all erbium-doped fibers, and wherein said first and second wavelength bands are in the range of about 1.53 to 1.56 $\mu$m.

* * * * *